United States Patent [19]
Holt

[11] 3,930,723
[45] Jan. 6, 1976

[54] METHOD AND APPARATUS FOR VIEWING PICTURES

[75] Inventor: James B. Holt, Woodland Hills, Calif.

[73] Assignee: Creative Optics, Inc., Woodland Hills, Calif.

[22] Filed: Apr. 22, 1974

[21] Appl. No.: 462,804

[52] U.S. Cl. .................. 353/70; 350/123; 353/75; 353/97
[51] Int. Cl.² ................. G03B 21/00; G03B 21/56
[58] Field of Search .............. 353/70, 75, 97, 122; 350/123; 178/7.88, 7.92

[56] References Cited
UNITED STATES PATENTS

| | | | |
|---|---|---|---|
| 1,419,901 | 6/1922 | Wyld | 350/123 |
| 2,045,120 | 6/1936 | Carpenter | 353/7 |
| 2,174,778 | 10/1939 | Croft | 353/75 |
| 2,320,760 | 6/1943 | Surre | 350/123 |
| 2,482,031 | 9/1949 | Rose | 353/75 |
| 3,246,943 | 4/1966 | Holt | 353/10 |

Primary Examiner—Richard E. Aegerter
Assistant Examiner—Steven L. Stephan
Attorney, Agent, or Firm—Ralph B. Pastoriza

[57] ABSTRACT

A concave mirror is positioned at an angle to a flat surface containing a picture so that a viewer can view the picture as reflected to his eye by the concave mirror. Masking is provided about the marginal edges of the concave mirror to define within the masking a reflecting area less than the total area of the picture. As a result, the degree of visibility of the top, bottom, and side portions of the picture can be changed by the viewer shifting his line of sight, the masking means defining a window which appears closer than the viewed picture so that a three-dimensional effect results. Perspective and keystone effects resulting from the angular relationships are compensated for by varying the width dimensions of the masking and the manner in which the picture is formed on the flat surface.

6 Claims, 8 Drawing Figures

U.S. Patent   Jan. 6, 1976   3,930,723
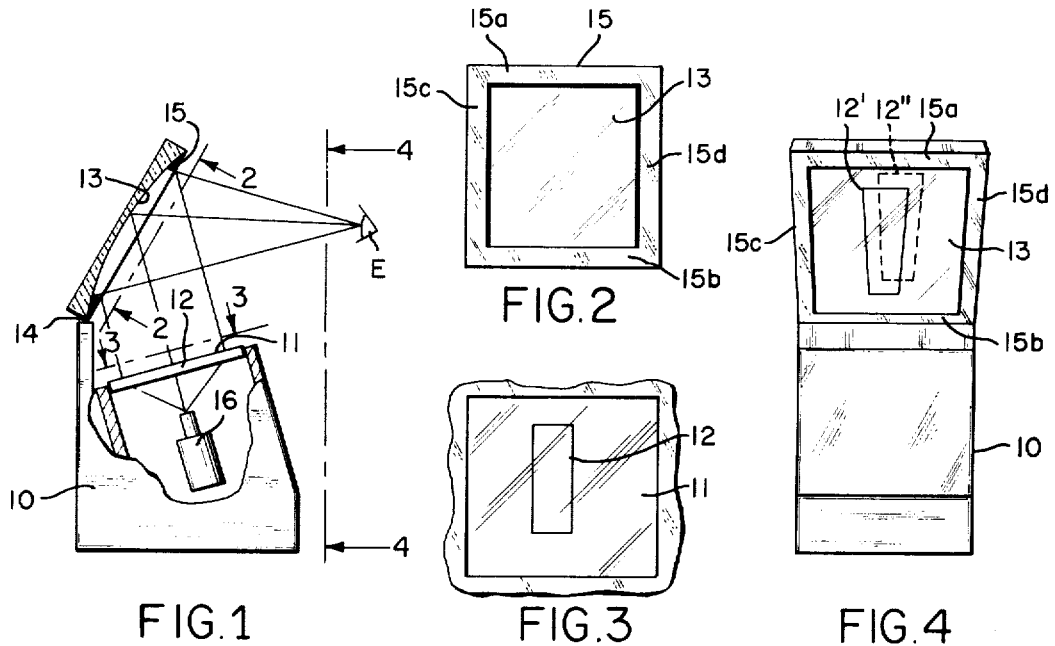
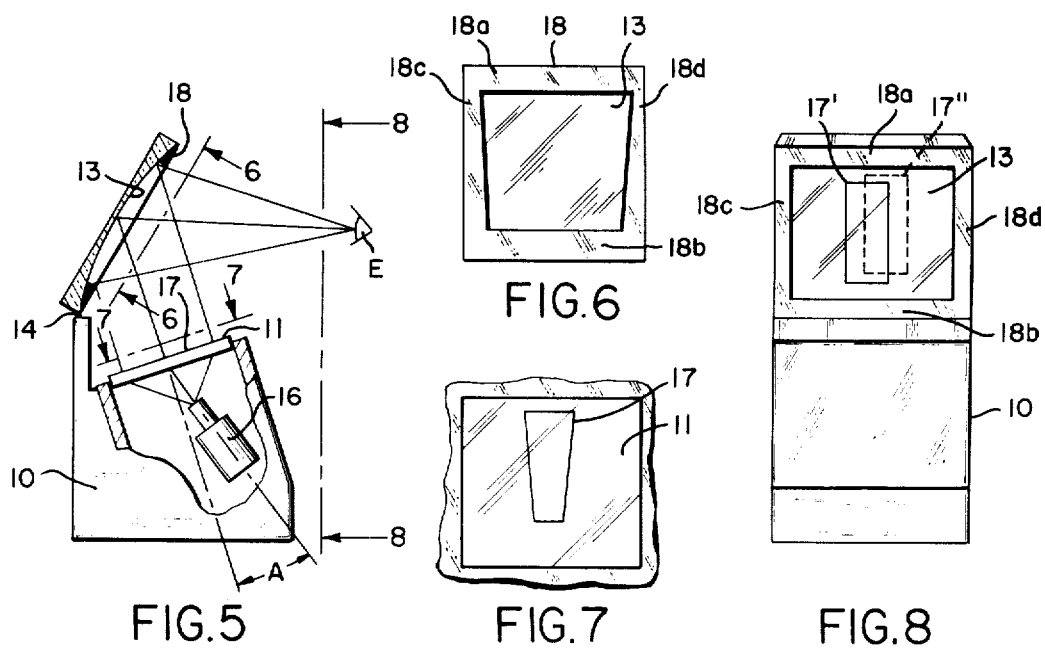

METHOD AND APPARATUS FOR VIEWING PICTURES

This invention relates generally to optical systems and more particularly to a method and apparatus for viewing pictures which provides a three-dimensional effect.

BACKGROUND OF THE INVENTION

Most systems for providing three-dimensional pictures take the form of viewing means in which a paralax effect is provided. This paralax effect is achieved by providing two side-by-side pictures of the same scene but taken at slightly different angles and then channeling the respective pictures to a viewer's left and right eye as by a conventional stereoscopic viewer.

It is known, however, that three-dimensional effects from pictures can be realized by providing a relatively large screen which is curved in such a manner as to vary the optical light paths from various portions of the picture. The effect is striking for large scenes wherein the scenery itself, when viewed in real life, would not exhibit any appreciable paralax effect. In other words, beyond twenty feet or so, the paralax is simulating depth effects is substantially nil. The "cinerama" and "cinemascope" processes for motion pictures provide good examples of depth perception through the use of a large curved screen.

In the past, the foregoing depth effects have been practical only in relatively large motion picture houses or in situations where it is practical to provide a large curved screen upon which the picture is formed. More recently, large curved screens in combination with flat mirrors have been provided which are adaptable to smaller pictures or pictures projected from a projector onto a flat mirror and thence reflected to the curved screen. My U.S Pat. No. 3,246,943, issued Apr. 19, 1966, sets forth such a method and apparatus for image projection.

It would be desirable, however, to provide a simple viewing means for conventional flat pictures in which three-dimensional effects are realized without requiring direct curving of the picture itself or special mounting means therefor. Further, it would be desirable to provide such viewing means wherein the size of the picture itself is of small significance so that the system is adaptable to pictures of various different sizes such as conventional 3 × 5 snapshots or pictures of the type used in simple commercial display devices as in exhibits and the like, or even home television pictures.

BRIEF DESCRIPTION OF THE PRESENT INVENTION

With the foregoing in mind, the present invention contemplates a method and apparatus for viewing pictures in which three-dimensional or depth effects are realized without the necessity of providing side-by-side or stereoscopic type pictures of curved screens for mounting the picture or displaying the picture itself.

More particularly, in accord with the invention, a flat surface containing a picture to be viewed is provided. A concave mirror is then positioned at an angle to the surface so that a viewer can view the picture as reflected to his eye by said concave mirror. Masking means are secured directly to the marginal edges or surfaces of the concave mirror to define within the masking means a reflecting area less than the total area of the picture. As a consequence, the degree of visibility of the top, bottom, and side portions of the picture can be changed by the viewer shifting his line of sight. The masking means essentially defines a window which appears closer than the viewed pictures so that a three-dimensional effect results.

BRIEF DESCRIPTION OF THE DRAWINGS

A better understanding of this invention will be had by referring to the accompanying drawings, in which:

FIG. 1 is a side elevational view partly cut away showing a basic apparatus for viewing pictures in accord with the invention;

FIG. 2 is a plan view of the curved mirror surface of FIG. 1 taken in the direction of the arrows 2—2;

FIG. 3 is a plan view of the flat surface containing a picture of FIG. 1 taken in the direction of the arrows 3—3;

FIG. 4 is a front elevational view of the apparatus of FIG. 1 taken in the direction of the arrows 4—4;

FIG. 5 is a side elevational view partly cut away of a modified apparatus;

FIG. 6 is a plan view of the mirror surface taken in the direction of the arrows 6—6 of FIG. 5;

FIG. 7 is a plan view of the flat surface containing a picture taken in the direction of the arrows 7—7 of FIG. 5; and FIG. 8 is a front elevational view of the apparatus taken in the direction of the arrows 8—8 of FIG. 5.

DETAILED DESCRIPTION OF THE INVENTION

Referring first to FIG. 1, there is shown a casing 10 having an upper flat surface 11 upon which a picture 12 to be viewed is provided.

A concave mirror 13 is supported by the casing 10 as indicated at 14 and disposed at an acute angle with the flat surface 11 such that a viewer can view the picture as reflected to his eye by the concave mirror. In FIG. 1, a viewer's eye is schematically indicated at E.

In accord with an important feature of this invention, the concave mirror 13 is provided with a masking means 15 secured directly to the marginal surfaces of the mirror to define a reflecting area within the masking means less than the total area of the picture.

The picture itself may comprise a flat photograph or any other scene which is positioned directly on the flat surface 11. Alternatively, the flat surface 11 may comprise a rear projection screen and the picture itself formed thereon by a projector 16 within the casing 10 as illustrated in FIG. 1.

Referring now to FIG. 2, there is shown the curved surface of the mirror 13 and the masking means 15. As shown, the masking means surrounds the entire periphery of the mirror, top and bottom portions being indicated at 15a and 15b and the side portions being indicated at 15c and 15d.

FIG. 3 shows in plan view the flat surface 11 with the picture 12 which, for illustrative purposes, is simply an elongated rectangle. It will be noted that the portion of the mirror in FIG. 2 within the masking means is smaller in area than the total area of the picture of FIG. 3.

Referring now to the front elevational view of FIG. 4, the reflected picture in the mirror 13 is indicated at 12'. It will be evident that the degree of visibility of the top, bottom, and side portions of the picture can be changed by the viewer shifting his line of vision. In other words, the masking means on the mirror essentially defines a window which appears closer than the viewed picture so that a three-dimensional effect results. A shifting of the line of vision, for example to the right and upwardly slightly as viewed in FIG. 4, would cause the reflected picture 12' to assume the dotted line position 12".

The foregoing effect is not only the result of the masking means being positioned on the mirror rather than on the flat surface to surround the picture, but also a result of the curvature of the mirror which provides a magnifying effect.

In the view of FIG. 4, it will be evident that the reflected image 12' appears slightly wider at the top than at the bottom. This effect is often referred to as a "keystone" effect and is a result of the different distance from the magnifying mirror of the top and bottom portions of the picture itself from surfaces of the mirror. Further, it will be evident that, as a consequence of the angulation of the mirror wherein the bottom portions of the mirror are physically further away from a viewer's eye than the top portions, the masking will appear somewhat wider at the top surface such as 15a as compared to the bottom surface 15b. Moreover, the side portions of the maskings 15c and 15d will appear to taper from top to bottom as a consequence of perspective effects.

In accord with a further feature of the present invention, the foregoing keystone effect and varying width effect of the masking can be overcome by modifying the apparatus as will now be described in conjunction with FIGS. 5, 6, 7, and 8.

Thus, referring first to FIG. 5, an apparatus is shown similarly to that of FIG. 1 except that the projector 16 has its optical axis at an angle to a perpendicular from the flat surface 11. As a consequence, the projected picture onto the flat surface 11 indicated at 17 will be distorted. Also, the curved mirror 13 is provided with a modified masking means 18 which varies in width.

The foregoing modifications will be better understood by referring, respectively, to FIGS. 6 and 7.

In FIG. 6, it will be noted that the upper masking means, designated 18a, is narrower in width than the bottom masking means 18b. The side masking means 18c and 18d, in turn, taper from the bottom toward the top.

In the plan view of the picture 17, as illustrated in FIG. 7, it will be noted that as a consequence of angulation of the optical axis of the projector 16 in FIG. 5, the resulting picture 17 is slightly distorted in that the upper portion of the rectangle is wider than the lower portion.

In FIG. 8, there is shown the resultant view of a viewer looking into the mirror 13. First, it will be noted that the masking means appears to be of uniform width since the respective effects are cancelled out by varying the width of the masking means as described in FIG. 6. Second, it will be noted that the viewed picture in the mirror is precisely rectangular thus corresponding to the original picture, the keystone effect being cancelled by the distorted image 17 as described in FIG. 7.

In other words, the angular relationship and curvature of the mirror is such as to distort the picture in an opposite sense to the original distortion whereby the picture appears undistorted when its reflection is viewed in the concave mirror.

The distortions described in FIG. 4, which distortions are eliminated by the modifications described in FIGS. 5–8, are greatly exaggerated for purposes of illustration. Actually, in many practical applications such as viewing small photographs and the like, the described distortions would not be appreciable and a simplified apparatus as shown in FIGS. 1–4 could be used.

However, in the case of rear view projection, it becomes feasible to incorporate the modifications described in FIGS. 5–8 to provide a true fidelity picture when viewed in the concave mirror.

In FIG. 8, the desirable effect of three dimensions results in the same manner as described in conjunction with FIG. 4. Thus, if the viewer shifts his line of vision to the right and upwardly, the picture 17' will appear to shift to the position 17" so that the masking means appears essentially as a window of uniform width.

From the foregoing description, it will be evident that the present invention has provided a greatly improved method and apparatus for viewing pictures wherein three-dimensional effects are provided.

What is claimed is:

1. A method for viewing pictures comprising the steps of:
   a. providing a flat surface containing a picture to be viewed;
   b. positioning a concave mirror at an angle to said surface, said angle being defined by the intersection of the plane of said concave mirror with said flat surface at a point below said concave mirror so that a viewer can view the picture as reflected to his eye by said concave mirror; and
   c. securing marginal masking means directly in full surface contact to all of the marginal edges of said concave mirror to define within the masking means of reflecting area less than the total area of the picture whereby the visibility of the top, bottom, and side portions of the picture can be changed by the viewer shifting his line of sight, said masking means defining a window which appears closer than the viewed picture so that a three-dimensional effect results.

2. The method of claim 1, including the additional steps of making the masking means on the top of the concave mirror narrower in width than on the bottom, and making the opposite side masking means taper in width from bottom to top such that when said mirror is viewed while at said angle, the masking means appears to have uniform width.

3. The method of claim 1, including the step of projecting said picture to be viewed onto said flat surface, the optical axis of the projection forming an angle with the perpendicular to said surface so that the picture appears distorted when viewed directly while contained on the surface, the angular relationship and curvature of said mirror being such as to distort the picture in an opposite sense to the original distortion whereby said picture appears undistorted when its reflection is viewed in said concave mirror.

4. An apparatus for viewing pictures comprising, in combination:
   a. a casing having an upper flat surface upon which a picture to be viewed is provided;
   b. a concave mirror supported by said casing in a position forming an acute angle with said flat surface, said angle being defined by the intersection of the plane of said concave mirror with said flat surface at a point below said concave mirror such that a viewer can view the picture as reflected to his eye by said concave mirror; and c. masking means secured directly in full surface contact to all of the marginal surfaces of said concave mirror to define a reflecting area within said masking means less than the total area of said picture whereby the visibility of the top, bottom, and side portions of the picture can be changed by the viewer shifting his line of vision, said masking means defining a window which appears closer than the viewed picture so that a three-dimensional effect results.

5. An apparatus according to claim 4, in which said masking means is narrower in width on the top of the concave mirror than on the bottom, the opposite side masking means tapering in width from bottom to top such that when said mirror is viewed while at said angle, the masking means appears to have uniform width.

6. An apparatus according to claim 4, in which said flat surface is defined by a rear projection screen, said casing including a projector for projecting said picture onto said flat surface, the optical axis of said projector forming an angle with the perpendicular to said surface so that the picture appears distorted when viewed directly while on said surface, the angular relationship and curvature of said mirror being such as to distort the picture in an opposite sense to the original distortion whereby said picture appears undistorted when its reflection is viewed in said concave mirror.

* * * * *